April 18, 1939.   J. KARMAZIN   2,154,942

METHOD OF MANUFACTURING TUBING

Filed April 8, 1936

INVENTOR.
John Karmazin,
BY
ATTORNEYS

Patented Apr. 18, 1939

2,154,942

UNITED STATES PATENT OFFICE 2,154,942

METHOD OF MANUFACTURING TUBING

John Karmazin, Huntington, Ind., assignor to General Motors Corporation, Dayton, Ohio, a corporation of Delaware Application April 8, 1936, Serial No. 73,258

1 Claim. (Cl. 113—35)

This invention relates to refrigerating apparatus or the like. More particularly, it refers to the manufacture of tubing which may be used for refrigerating apparatus and for other purposes.

An object of this invention is to provide tubing, and a method of manufacture thereof, in which costs have been reduced materially, and in which the seam of the tube may be welded without danger of causing the bonding material to puddle within the tube.

Further objects and advantages of the present invention will be apparent from the following description, reference being had to the accompanying drawing, wherein a preferred form of the present invention is clearly shown.

Figure 1:
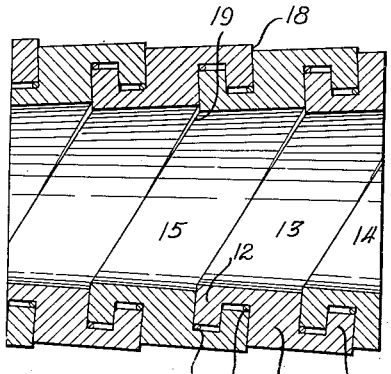
Fig. 1 is a longitudinal cross-section and shows one embodiment of the tube partially manufactured.
Figure 2:
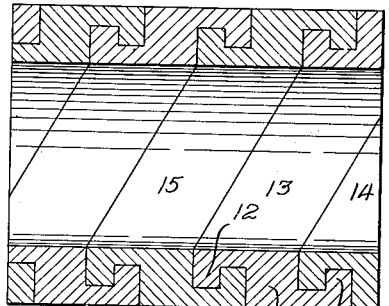
Fig. 2 shows the tube of Fig. 1 in its completed form.

In practising this invention, a strip of metal is extruded or otherwise formed with flanged edges. In the modification shown in Figs. 1 and 2, this metal strip 10 is formed with flanged edges 11 and 12. This metal strip is wound so that the edges 11 and 12 of one loop 13 lock with the adjacent edges of the adjacent loops 14 and 15, this locking arrangement extending continuously throughout the length of the tube at all of the loops of the tube. Bonding material is placed between the interlocked edges of the loops. Preferably, this is accomplished by simultaneously winding one or more wires 16, 17 of bonding material while the metal strip 10 is being wound. If the metal strip 10 is made of steel, the wires 16 and 17 preferably are of copper or of a copper alloy. After the tube is thus wound, the edges of the loops are rolled, or otherwise forced together, to flatten out the wires 16 and 17 and reduce the corners 18 and 19 substantially to a smooth finish. Thereafter, the tube is heated in a reducing atmosphere, such as hydrogen, at a sufficient temperature to cause the bonding material of the wires 16 and 17 to flow throughout the seam and to weld the tube completely. Thereafter the tube is cooled in the reducing atmosphere. The heating and cooling of the tube preferably is performed in a furnace through which the tube is passed.

Figure 3:
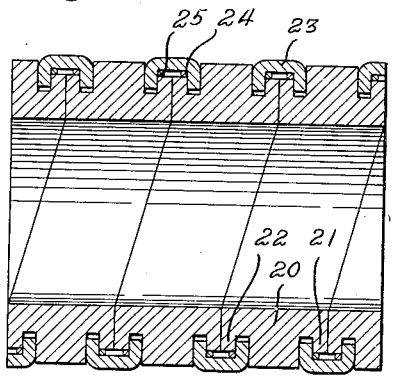
Fig. 3 is a view similar to Fig. 1 and shows a modification of the tubing partially manufactured.
Figure 4:
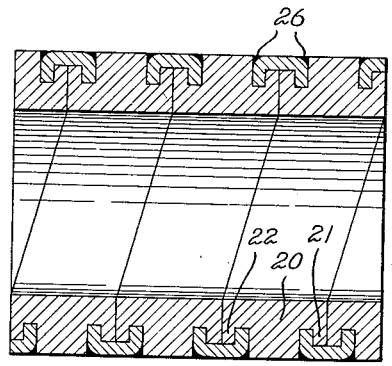
Fig. 4 shows the tubing of Fig. 3 in its completed form.

In the modification shown in Figs. 3 and 4, the metal strip 20 is formed with flanges 21, 22. The strip is wound spirally, and the adjacent edges of one loop are locked with the adjacent edges of the adjacent loops by means of another metal strip 23, in this embodiment being U-shaped, which is wound into the flanges of the strip 20 to lock the same. Bonding material is placed between the strips 20 and 23, and preferably this is accomplished by providing one or two wires 24 and 25 of bonding material, which wires are wound either before or simultaneously with the strip 23. Thereafter, the strip 23 is rolled or otherwise forced into the tube to flatten out the wires 24 and 25 and the tube is heated in a reducing atmosphere to cause the bonding material to flow throughout the seams between the strips 20 and 23 and to cause a certain amount of puddling along the edges 26 which thus tends to form a smooth tube on the outside. In this modification also, the strips 20 and 23 may be of steel, and the bonding material may be copper or a copper alloy.

Figure 5:
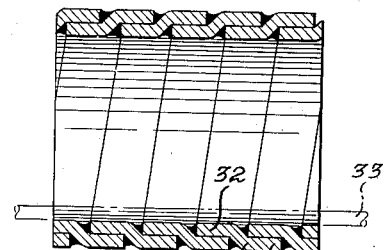
Fig. 5 shows another modification in its completed form.

In the modification shown in Fig. 5, the metal strip 30 is formed with flanges 31 and 32, and the strip is spirally wound so that these flanges lock with the adjacent flanges of the adjacent loops to form a continuous tube. Bonding material may be distributed throughout the tube either by rolling a thin flat strip of bonding material between the adjacent locked flanges or by placing a wire 33 of bonding material inside of the tube and longitudinally thereof. Thereafter the tube is heated and cooled in a reducing atmosphere to weld the edges together.

Figure 6:
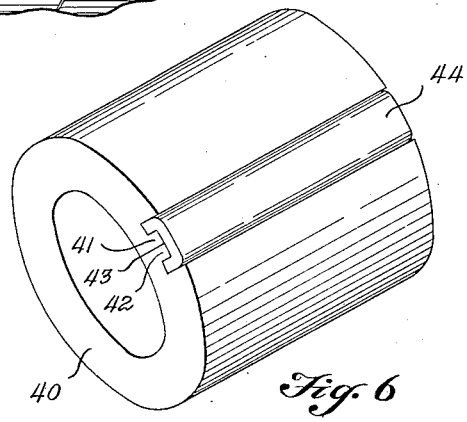
Fig. 6 is a perspective view of another modification.

In the modification shown in Fig. 6, a strip 40 is formed with flanges 41 and 42, and the strip is wound to form a longtiudinal seam 43 along the tube. The flanges 41 and 42 are locked together by another strip 44, peferably U-shaped, forced into the pockets of the flanges 41 and 42, with bonding material in the form of a wire or a strip inside of the strip 44. The strip 44 is then rolled completely into the pockets of the flanges 41 and 42 to provide a substantially smooth exterior for the tube, and the tube is then heated and cooled in a reducing atmosphere to braze the same.

Figure 7:
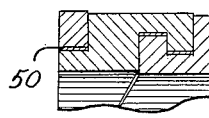
Fig. 7 shows a modified form of strip bonding material.

While I have shown round wires in the various modifications, it is to be understood that thin flat strips may be used in lieu thereof, these strips also being of suitable bonding material such as copper or copper alloy. Such strips may be of a width equal to the longitudinal portions of the seams which they occupy, as indicated, in exaggerated thickness, at 50 in Fig. 7. The showing in Fig. 7 is intended to be representative of all of the modifications, it being understood that flat strips may be used similarly in the modifications of Figs. 3 to 6 inclusive.

While the form of embodiment of the invention as herein disclosed, constitutes a preferred form, it is to be understood that other forms might be adopted, all coming within the scope of the claim which follows:

What is claimed is as follows:

The method of manufacturing tubing having substantially smooth inner and outer surfaces which comprises spirally winding a metal strip having edges of reduced thickness provided with narrow grooves, locking the edges of one loop thus formed with adjacent edges of adjacent loops with a U-shaped strip of metal inserted in said grooves, inserting bonding material between said strips, and heating said tube to bond said edges.

JOHN KARMAZIN.